United States Patent van Vuuren

[11] Patent Number: 5,165,617
[45] Date of Patent: Nov. 24, 1992

[54] METHOD AND DEVICE FOR ROLLING UP ONE OR MORE SODS

[76] Inventor: Johannes van Vuuren, Harmelerwaard 21, NL-3481 LC Harmelen, Netherlands

[21] Appl. No.: 625,297

[22] Filed: Dec. 10, 1990

[30] Foreign Application Priority Data

Dec. 13, 1989 [NL] Netherlands .................. 89.03062

[51] Int. Cl.$^5$ .................. A01B 45/04; B65H 18/00; B65H 18/08
[52] U.S. Cl. .................. 242/55.1; 242/67.2; 172/20
[58] Field of Search .......... 242/55.1, 67.1 R, 67.2, 242/DIG. 3; 100/40, 76; 172/19, 20

[56] References Cited

U.S. PATENT DOCUMENTS

| | | | |
|---|---|---|---|
| 3,053,328 | 9/1962 | Geipel | 100/76 |
| 3,235,011 | 2/1966 | Pasinski et al. | 172/19 |
| 3,314,627 | 4/1967 | Wetzler | 242/55.1 |
| 3,315,908 | 4/1967 | Wetzler | 242/55.1 |
| 3,464,641 | 9/1969 | Brouwer | 242/55 |
| 3,658,134 | 4/1972 | Bibby | 172/20 |
| 3,790,096 | 2/1974 | Brouwer | 172/19 X |
| 4,142,691 | 3/1979 | Watton | 242/55 |
| 4,573,644 | 3/1986 | Brown | 242/55.1 X |
| 4,765,554 | 8/1988 | Tuffal et al. | 242/DIG. 3 |
| 4,892,152 | 1/1990 | van Vuuren | 172/20 |

FOREIGN PATENT DOCUMENTS 2368423 5/1978 France.
1566175 4/1980 United Kingdom.

Primary Examiner—Daniel P. Stodola
Assistant Examiner—Michael R. Mansen
Attorney, Agent, or Firm—Webb, Burden, Ziesenheim & Webb

[57] ABSTRACT

A method and apparatus for rolling-up one or more rolls of sod wherein the sod is conveyed on a conveyor against a blocking mechanism which include tooth like elements which extend between the belts of the conveyor. The blocking mechanism blocks the progress of the sod's leading edge causing it to begin to curl. After curling up the leading edge presses the teeth of the blocking mechanism upward to a point which allows the curled up leading portion to be conveyed past the blocking mechanism. Frictional elements grip the curled up portion of the sod to cause continued rolling up of the sod. The blocking mechanism is provided with a drag end for pressing against the following portions of the sod.

10 Claims, 7 Drawing Sheets

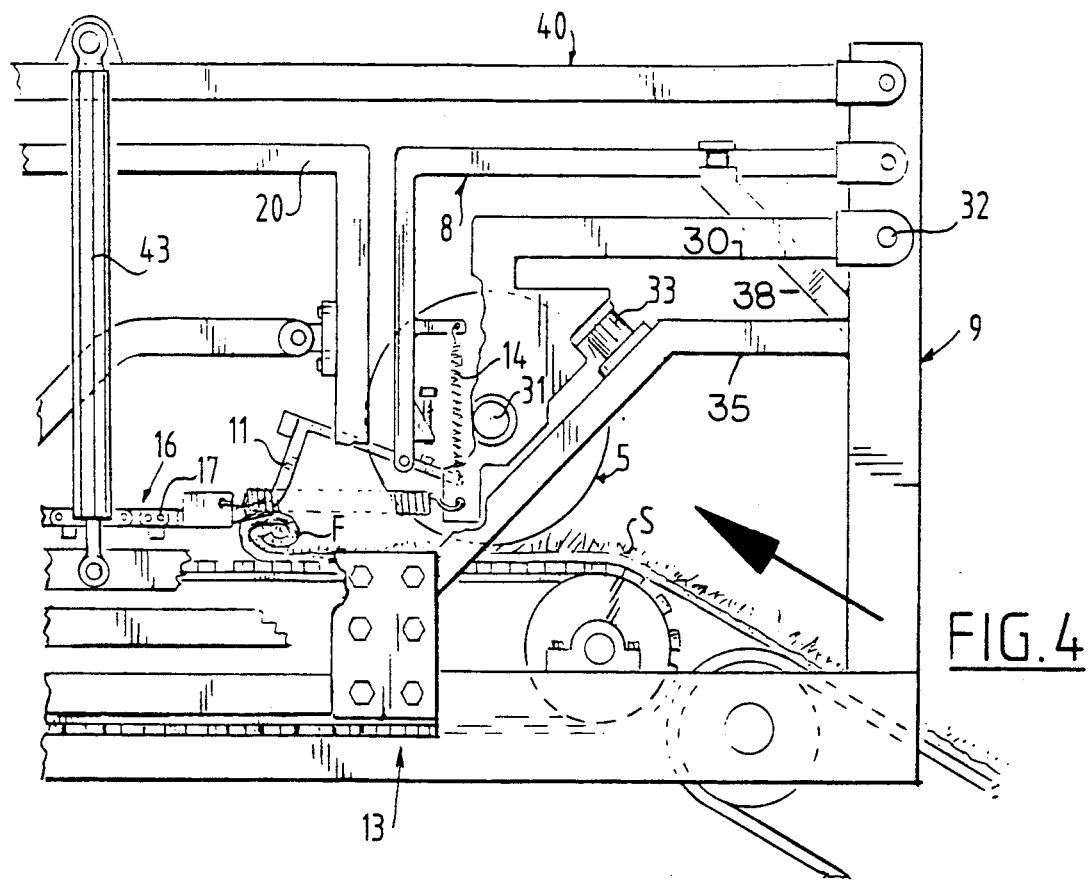

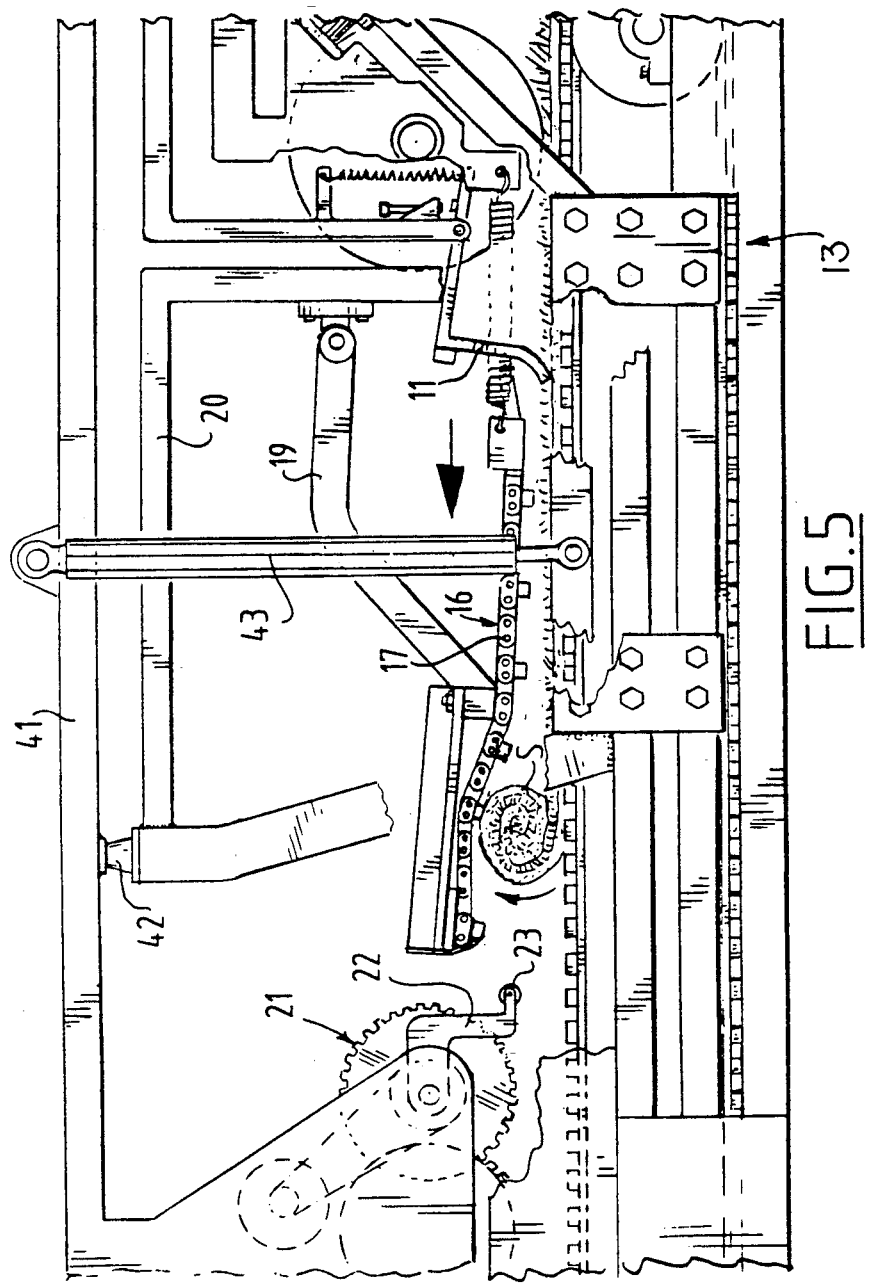

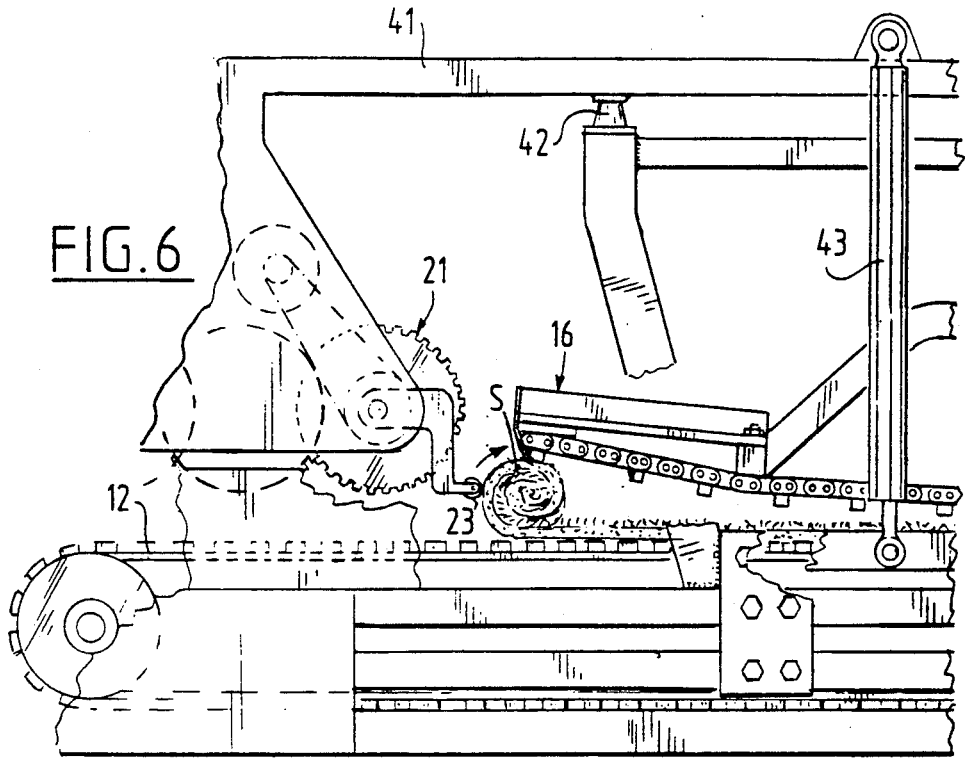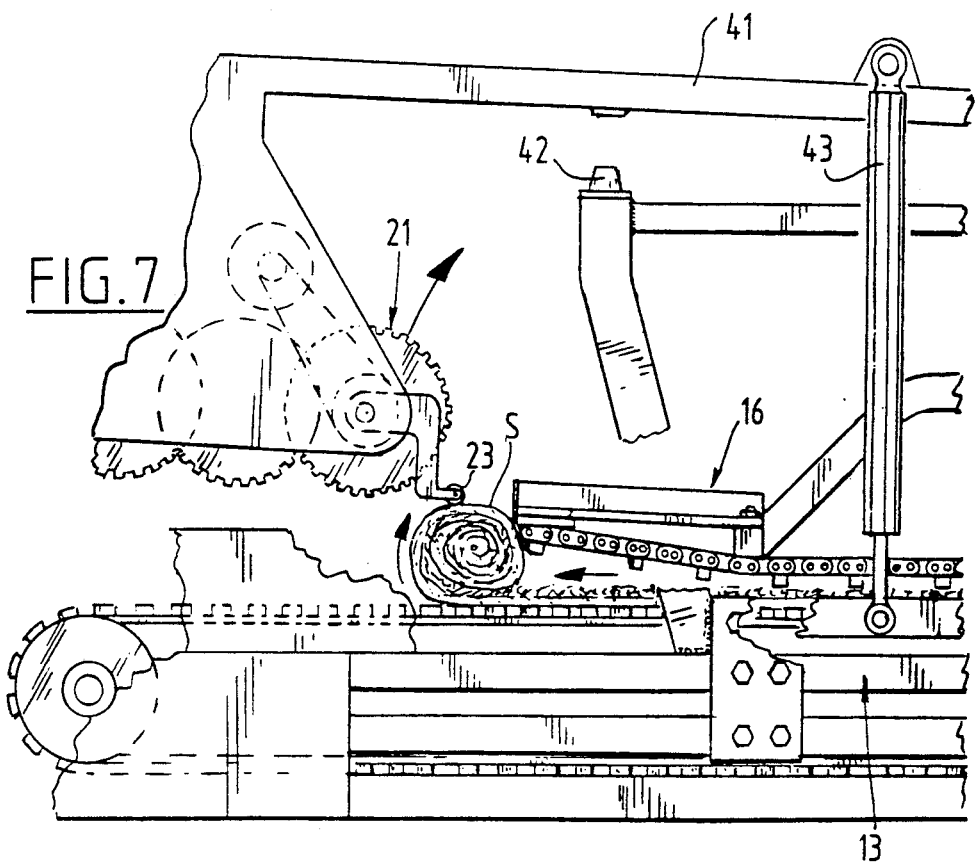

METHOD AND DEVICE FOR ROLLING UP ONE OR MORE SODS

Turf sods are being used more and more for rapid laying of a field of grass that can also be used quite quickly after laying.

The growing of grass turf is being carried out on increasingly larger scale, therefore there is a need for cutting turf sods from a cultivated grassland with little manpower. These turf sods then have to be rolled up and offered for sale in a rolled-up state.

The object of the present invention is to improve existing methods and devices for rolling up turf sods. Existing methods and devices are described in the U.S. Pat. No. 4,142,691 and the Netherlands patent 140,701.

For this purpose the present invention provides a method for rolling up one or more sods, comprising the following steps, transporting a sod on a conveyor having spaced belts against a blocking means for blocking the leading edges of said sods, wherein said blocking means extend across the transport path of said sod and between said conveyor belts in said spaces; curling up said sod such that a leading portion of said sod causes said blocking means to move to a position which will allow said curled up sod to continue moving on said conveyor; and gripping said curled up sod during said continued transport on said conveyor by frictional means in order to cause said curled up sod to continue to roll up, wherein said blocking means is held against a portion of the turf sod being rolled which is not yet rolled up and a device for rolling up one or more turf sods comprising; a conveyor for transporting said sods having spaced belts extending in a lengthwise direction of the conveyor; and blocking means for blocking the leading edges of said sods which is movable between at least a lower position and an upper position and which in said lower position extends between said conveyor belts into said spaces.

The present invention is particularly applicable if an automatic stacking device for the rolled-up sods is employed, wherein only a driver for the tractor is still required with the present invention and an automatic stacker, consequently no person need stand behind the rolling-up unit to then roll up the sod and stack it by hand.

Further advantages, features and details will become apparent in the light of the description of the preferred embodiment of the device according to the present invention, wherein reference is made to the annexed drawings, wherein:

FIGS. 4-8 show details of the embodiment of FIGS. 2 and 3 by way of explanation of the operation thereof.

Figure 1:
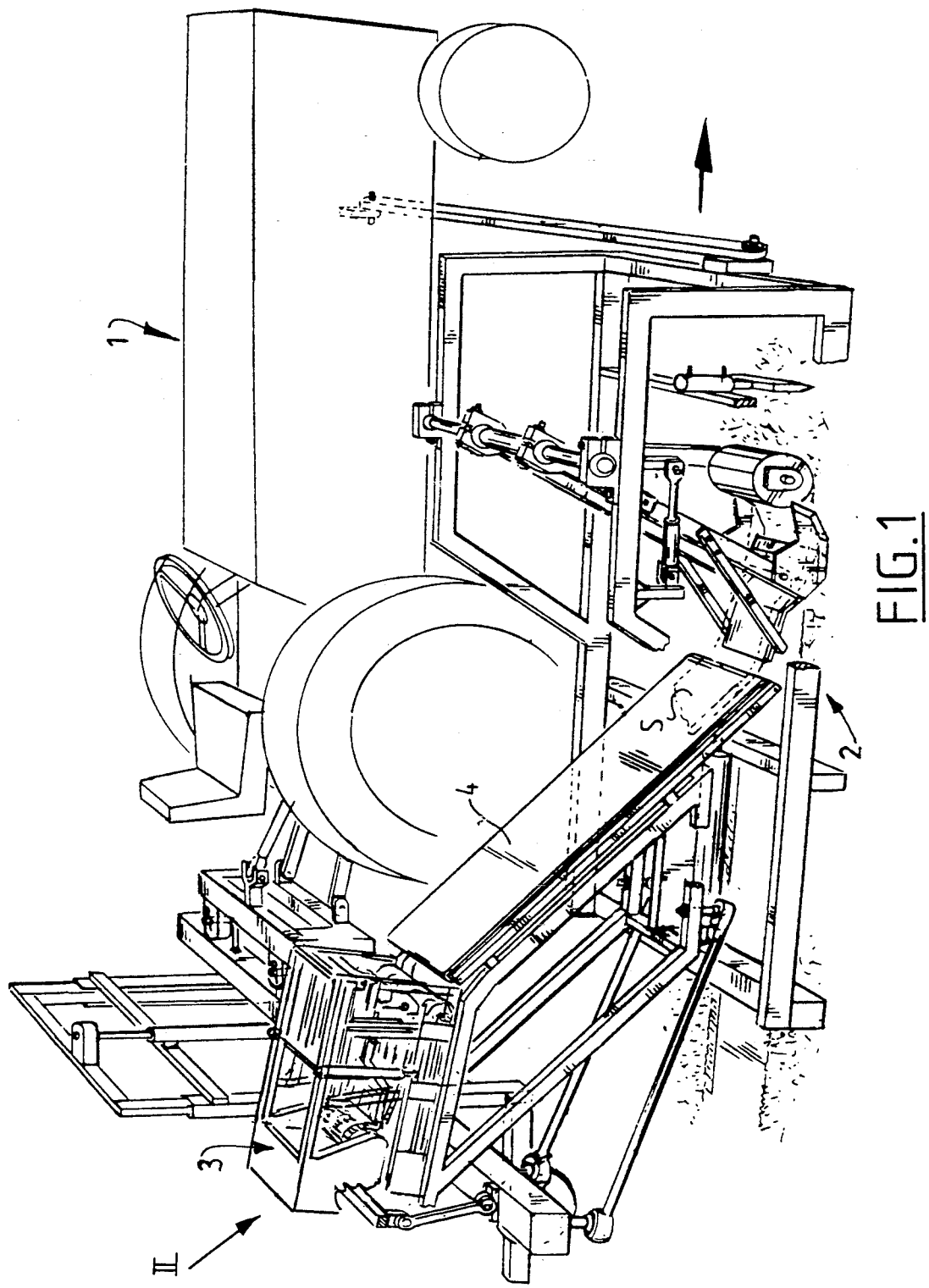
FIG. 1 shows a perspective view of a preferred embodiment of the present invention arranged with a tractor with cutting unit.

Coupled to a tractor 1 (FIG. 1) is a cutting device 2 for cutting grass sods S which move via a booster conveyor into a rolling-up unit 3 and are there rolled up. Further details of cutting unit 2 are described in the Netherlands disclosure 87.01921, the contents of which are incorporated herein by reference.

Figure 2:
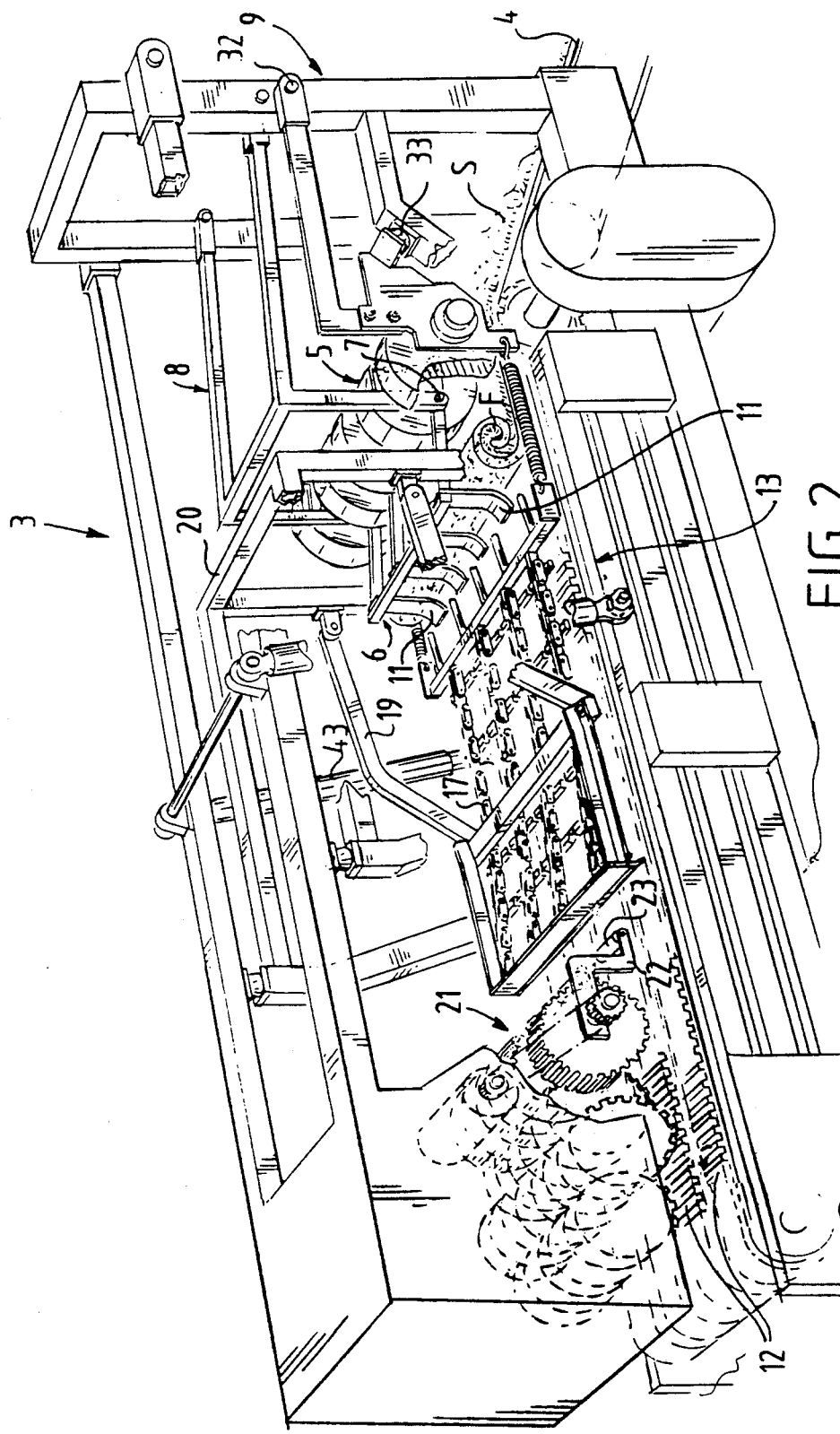
FIG. 2 is a perspective view of detail II of FIG. 1.

After a turf sod S leaves the booster conveyor 4 it is guided in a flat state under a pressure roller or set of pressure wheels 5 (FIGS. 2-4) as far as blocking means 6 which are arranged pivotally at bearing 7 on a part 8 of the frame 9 of the rolling-up unit 3. The blocking means 6 comprise tooth-like elements 11 which in a downward pivoted position (FIG. 3) reach between belts 12 of conveyor 13 in order to be able to grip a sod S with certainty and cause it to roll up. Of advantage here is that material dropping from a sod S is easily carried away downward. The downward pivoted position of blocking means 6 in the rest position thereof because of the weight of the blocking means 6, and, optionally, additionally because of the co-action of a spring 14. In downward pivoted position the teeth 11 point slightly towards the leading end of the arriving turf sod S so that the leading end F of the sod S (FIG. 3) curls up easily against these teeth.

As the conveyor 13 is provided with belts 12 and with intermediate spacing between the belts 12, an embodiment, which is not shown, is also conceivable wherein a blocking member provided with teeth were disposed under the conveyor, wherein this blocking member rises slightly each time thereby ensuring that a sod comes up against a blocking member then positioned above the conveyor. This embodiment prevents, as does the embodiment shown, the turf sod S from moving past the blocking member, and this moving past the blocking member by the sod S is prevented even if there is a thin leading edge of the sod, or a wet spot on the blocking member, or dirt on the blocking member.

The blocking means are preferably placed between the wheels 5 or in recesses of the pressure roller 5 so that a small interval is present between the point of pressure of the wheels or pressure roller 5 and the point where the rolling up begins.

The leading end F then presses the teeth 11 upward (FIG. 4) and this leading end F is then transported under resisting means 16 (FIGS. 4, 5).

The teeth 11 are preferably provided with a curved drag end for pressing against and holding stretched the sod as well as for raking off loose grass thereon.

The resisting means 16 preferably comprises chains 17 so that the surface of the sod S is closely followed by these slightly flexible resisting means. In addition, the space between chains and sod leading end F increases in the conveying direction of the sod S, since as it is rolled up the sod acquires a greater size in vertical direction. The chains are constructed give slightly when the sod passes, wherein at the suspension points of the chain a different pressure force is exerted than between the suspension points. This has been found in practice to operate well for firmly pressed rolling up of a turf sod. In a different preferred embodiment (not shown) the resisting means comprise, instead of chains, plastic belts which require less maintenance, are less subject to wear than chains and are, if required, easily replaceable as a whole.

Figure 8:
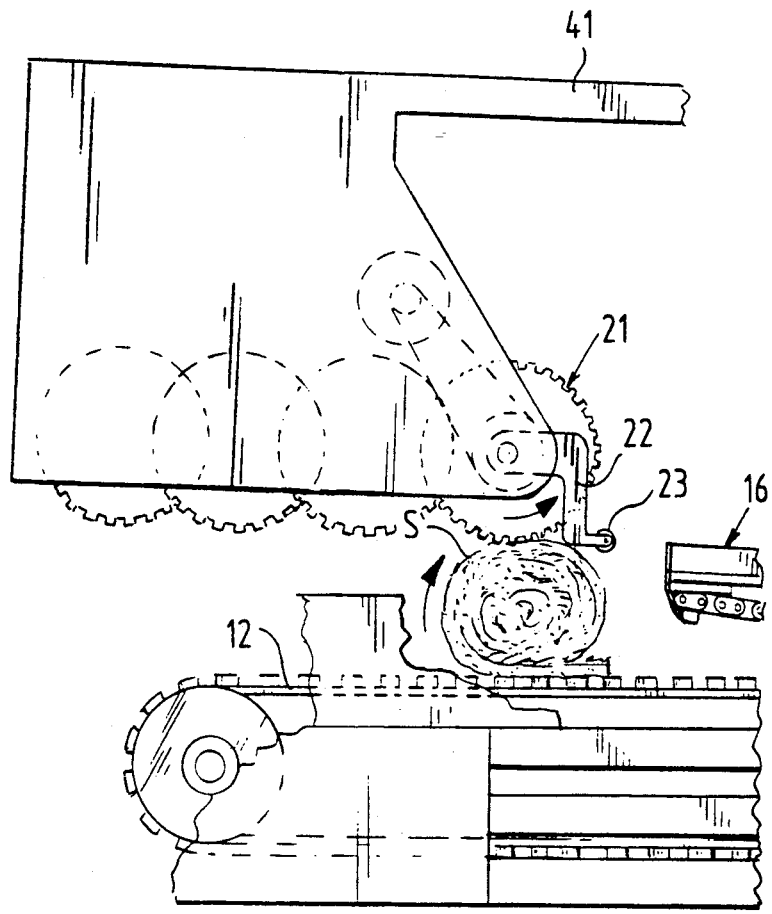

This construction further enables adjustment of the pressure force as desired. It is advantageous if the sod is rolled up more tightly under the first part of the resisting means 17 than at the end thereof. For this purpose the resisting means are preferably attached pivotally to a frame part 20 using an arm 19. As can be seen in FIG. 6, 7 and 8, the rolled-up turf S is gripped in rolled-up position from beneath the resisting means 16 (see FIG. 6) by round guide rod 23 fixed to an arm 22 for holding sod S in the rolled-up position which is provided on driven wheels 21. Wheels 21 are provided with a roughened or toothed surface for firm gripping on the underside of the sod S and are preferably pivotally attached to each other so that the rollers can properly follow the forwardly transported rolled-up sod.

Another advantageous adjustment is as the thickness of a sod which may be varied dependent on the ground from which the sod has to be cut also depending on the length of grass and the quantity of material hanging from the sod, which is adjustable using the cutting unit 2. The thickness of the sod can vary between 0.5 cm and 2 cm.

Figure 3:
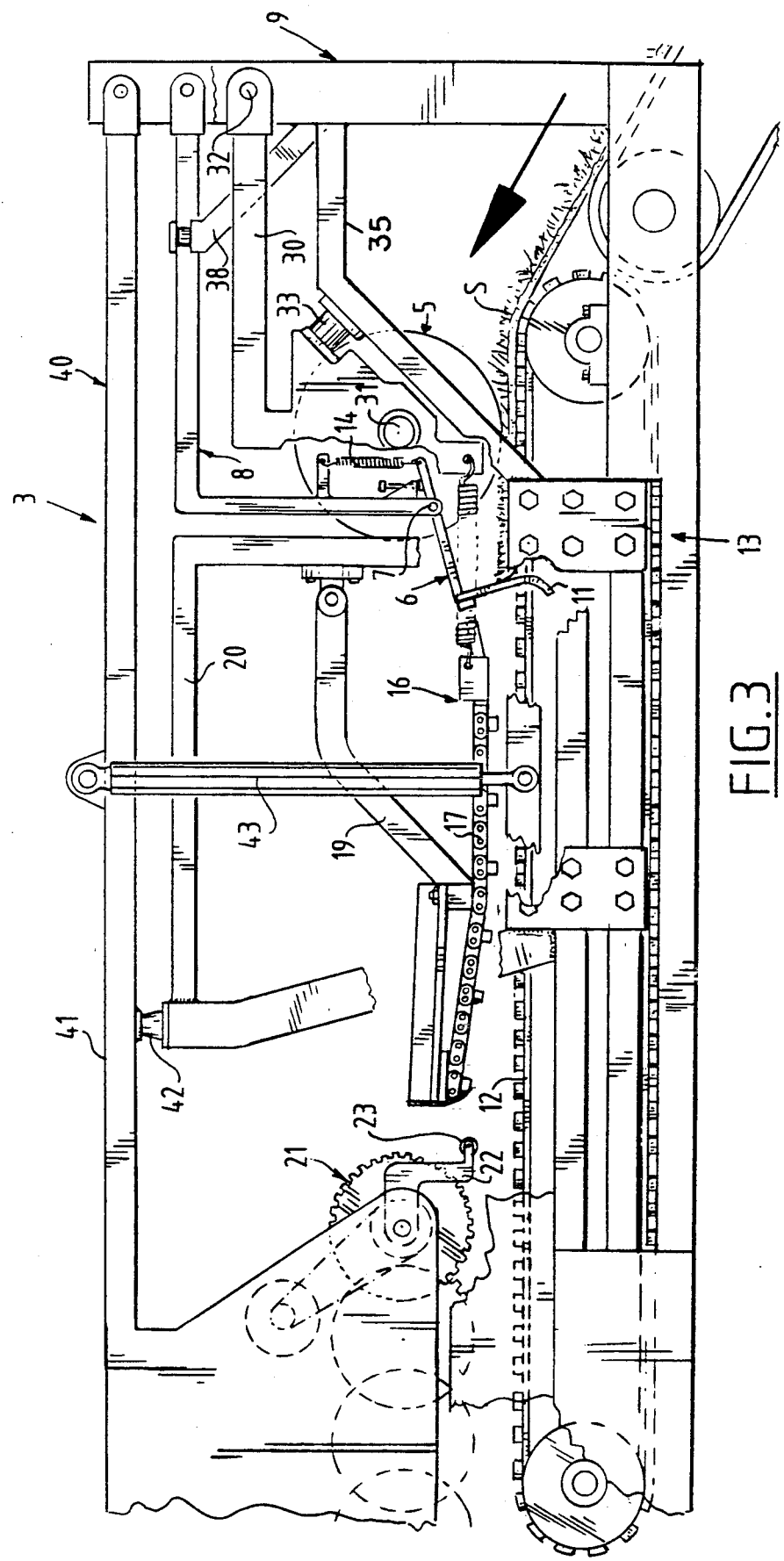
FIG. 3 is a side view of the preferred embodiment of FIG. 2.

As can be seen clearly in FIG. 3, there are preferably fixed to a main frame 9 three sub-frames 30, 8, and 40, respectively which are each upwardly pivotable in order to provide for easy adjustment, cleaning and/or repair of the rolling-up unit.

The conveyor 13 is fixedly connected to main frame 9 via arm 35. Subframe 30 is also fixedly connected thereto, while using arm 19 the resisting means 16 can be swivelled upward.

Subframe 40 is connected pivotally to the main frame 9 while arm 41 supports through support 42 of the fixed frame part 20. Depending on the height of sod S (see FIG. 7) subframe 40 is to a greater or lesser extent raised via guide roll 23 contacting the rolled up sod, wherein a damping member 43 for damping this upward swivelling is arranged between frame part 40 and the fixedly disposed conveyor 13.

The pressure roller or wheels 5 are mounted rotatably on a shaft 31 which is fixed to subframe 30 that can swivel upward at hinge 32 relative to the main frame 9. Subframe 30 is supported on the fixed frame in preferably adjustable support points 33.

The subframe 8 to which the blocking means 6 are coupled is also supported on a fixed arm 38, wherewith the drag depth of the blocking means 6 between the belts of conveyor 13 is preferably adjustable.

The embodiment shown has many advantages as described above compared to the prior art; the rights of the present invention are defined by the following claims.

1. A method for rolling up one or more sods, comprising the following steps:
   transporting a sod on a conveyor having parallel spaced belts against a blocking means;
   blocking the leading edges of said sods by extending said blocking means across the transport path of said sod and between said conveyor belts;
   curling up said sod such that a leading portion of said sod causes said blocking means to move to a position which will allow said curled up sod to continue moving on said conveyor; and
   gripping said curled up sod during said continued transport on said conveyor by frictional means in order to cause said curled up sod to continue to roll up.

2. The method of claim 1 further comprising the step of holding said blocking means against a portion of said turf sod being rolled which is not yet rolled up.

3. A device for rolling up one or more turf sods comprising:
   a conveyor for transporting said sods having parallel spaced belts defining at least one space therebetween extending in a lengthwise direction of the conveyor; and
   blocking means for blocking the leading edges of said sods which is movable between at least a lower position and an upper position and which in said lower position extends between said conveyor belts into at least one said space and which in said upper position said blocking means is spaced from said conveyor belts.

4. The device as claimed in claim 3 wherein said blocking means is pivotable between said lower position wherein said blocking means extends between said conveyor belts and said upper position wherein said blocking means allows for further transport of said turf sod.

5. The device as claimed in claim 3 further comprising rollers disposed above said conveyor for pressing on said turf sod.

6. The device as claimed in claim 3 further comprising resisting means for providing resistance during the continued rolling up of said turf sods after curling over of said sod leading edge.

7. The device as claimed in claim 6 wherein said resisting means is flexible.

8. The device as claimed in claim 6 wherein said resisting means is formed by at least one belt disposed in a lengthwise direction above said conveyor.

9. The device of claim 6 wherein said resisting means is formed by a plurality of belts.

10. A device for rolling up one or more turf sods comprising:
   a conveyor for transporting said sods having parallel spaced belts defining at least one space therebetween extending lengthwise, blocking means for blocking the leading edges of said sods wherein said blocking means is pivotable at least between a lower position wherein said blocking means extends between said conveyor belts into said at least one space and an upper position wherein said blocking means allows for continued transport in order to enable curling up of the leading end of said turf sod; rollers disposed above said conveyor for pressing on said turf sod; and resisting means for providing resistance during the further rolling up of the turf sods after curling over wherein the resisting means which is formed by at least one belt disposed in a lengthwise direction above said conveyor.

* * * * *